United States Patent [19]

Tamosauskas et al.

[11] 4,391,876

[45] Jul. 5, 1983

[54] AQUEOUS PEROXIDE EMULSION FOR USE WITH GLASS FIBERS

[75] Inventors: Albert E. Tamosauskas, Pittsburgh; Chester S. Temple, McKees Rocks, both of Pa.

[73] Assignee: PPG Industries, Inc., Pittsburgh, Pa.

[21] Appl. No.: 136,645

[22] Filed: Apr. 2, 1980

[51] Int. Cl.$^3$ .......................... B32B 9/00; C08K 3/40
[52] U.S. Cl. ................ 428/392; 106/287.23; 106/243; 252/186.42; 252/312; 252/426; 524/111; 524/583; 524/312; 524/313; 524/370; 524/377
[58] Field of Search ............... 260/29.6 PM, 29.6 PH, 260/185, 42.15, 42.18, 22 R, 23 EM; 252/186, 312, 426, 186.42; 106/243, 287.23; 428/378, 392

[56] References Cited

U.S. PATENT DOCUMENTS

| | | | |
|---|---|---|---|
| Re. 28,818 | 5/1976 | Eymans et al. | 252/186 |
| 2,343,094 | 2/1944 | Smith | 428/375 |
| 2,886,532 | 5/1959 | Richmond et al. | 252/186 |
| 3,013,915 | 12/1961 | Morgan | 428/391 |
| 3,061,554 | 10/1962 | Vartanian et al. | 252/426 |
| 3,118,866 | 1/1964 | Gregorian | 260/94.9 |
| 3,377,407 | 4/1968 | Kressin et al. | 252/426 |
| 3,484,223 | 12/1969 | Vanderbilt et al. | 65/3 |
| 3,485,811 | 12/1969 | Levine et al. | 252/426 |
| 3,490,936 | 1/1970 | Cole et al. | 117/54 |
| 3,520,825 | 7/1970 | Kochler et al. | 252/426 |
| 3,583,959 | 6/1971 | Shen et al. | 260/45.7 |
| 3,635,834 | 1/1972 | Cilento et al. | 252/34 |
| 3,775,341 | 11/1973 | Barter | 252/426 |
| 3,795,630 | 3/1974 | Jaspers et al. | 252/426 |
| 3,837,898 | 9/1974 | McComb et al. | 260/29.7 H |
| 3,840,426 | 10/1974 | Flautt et al. | 260/17 R |
| 3,849,148 | 11/1974 | Temple | 252/8.9 |
| 3,855,175 | 12/1974 | Kakizaki | 260/42.15 |
| 3,969,299 | 7/1976 | Burns et al. | 260/29.6 HN |
| 3,988,261 | 10/1976 | Barter et al. | 252/431 C |
| 3,989,661 | 11/1976 | Bondy | 260/23 EM |
| 4,009,132 | 2/1977 | Furukawa et al. | 260/22 R |
| 4,039,475 | 8/1977 | Oosterwijk et al. | 252/431 R |
| 4,039,716 | 8/1977 | Johnson | 428/378 |
| 4,049,597 | 9/1977 | Motsinger | 260/18 S |
| 4,067,835 | 1/1978 | Takamori et al. | 260/29.6 PM |
| 4,105,584 | 8/1978 | Norback et al. | 252/426 |
| 4,228,047 | 10/1980 | Pippin et al. | 260/17.4 ST |
| 4,245,072 | 1/1981 | Vraneck et al. | 525/209 |
| 4,259,190 | 3/1981 | Fahey | 428/378 |
| 4,263,362 | 4/1981 | Straka | 428/378 |

FOREIGN PATENT DOCUMENTS

| | | | |
|---|---|---|---|
| 91259 | 10/1972 | Canada. | |
| 49-26937 | 7/1974 | Japan | 524/262 |
| 55-15760 | 12/1980 | Japan | 260/29.6 PM |

OTHER PUBLICATIONS

Derwent Abst. 35218V/19 Mitsubishi J48034950 (May 23, 1973) "Synthetic Elastomer ...".
Sheppard et al., "Azo and Peroxide F. R. Initiators ..." 33rd Annual Technical Conference 1978.
"Lucidol, Organic Peroxide" Product Bulletin Pennwalt Chemicals Buffalo, New York, Bulletion #7.301.
Derwent Abst. 446 W/01 J49053958 (5-25-74) Mitsubishi "Glass Fiber ...".
Derwent Abst. 57717V/32 J74026937 (7-13-74) Mitsui "Reinforced Polyolefin Prod. ...".

Primary Examiner—John C. Bleutge
Assistant Examiner—Herbert J. Lilling
Attorney, Agent, or Firm—Kenneth J. Stachel

[57] ABSTRACT

An aqueous emulsion of an organic peroxide that is liquid at a temperature of 20° C. and that is insoluble or has limited solubility in water is provided that has improved shelf-stability, shear-stability and process stability and has good dilutability and has a particle size of around 1.5 microns or less. The emulsion has from 1 weight percent of the emulsion to about 70 weight percent of the emulsion of an organic peroxide that is a liquid at 20° C. and in particular that has a half-life exceeding 60 hours at 212° F. (100° C.) and 20 minutes at 300° F. (149° C.) The emulsion also has about 0.005 to about 15 weight percent of the emulsion of a nonionic emulsifier blend. The emulsifier blend has three emulsifiers selected from polyalkylene glycol ethers, dialkylaryl polyether alcohols, and polyoxy-propylene-polyoxyethylene condensates and the like nonionic emulsifiers having a particluar HLB range for each of the three emulsifiers. The remaining weight percent of the emulsion is water.

The method of preparing the aqueous emulsion involves the addition of the emulsifier blend to the liquid peroxide. One of the emulsions is split into two portions for the addition.

The aqueous organic peroxide-containing emulsion is incorporated into a sizing composition for treating glass fibers to produce treated glass fibers for use as reinforcement in polymers.

15 Claims, No Drawings

AQUEOUS PEROXIDE EMULSION FOR USE WITH GLASS FIBERS

BACKGROUND OF THE INVENTION

The present invention is directed to an aqueous emulsion prepared from a liquid organic peroxide, an aqueous treating solution containing the emulsion, and treated glass fibers. More particularly, the present invention is directed to an aqueous peroxide emulsion made from a liquid organic peroxide, aqueous sizing containing same, and sized glass fibers prepared for bonding to polymers in the reinforcement of polymeric materials such as polyolefins, and unsaturated polyesters.

Organic peroxides that decompose by initial cleavage of the oxygen-oxygen bond to produce free radicals act as initiators for vinyl monomers and other vinyl-containing materials. There are over fifty different organic peroxides classified into nine major types that are used commercially in the polymer and resin industries. The half-life ($T_{\frac{1}{2}}$) of various peroxides, which is given as a function of temperature can range from around 0.01 hours at elevated temperatures to as long as 1,000 hours at lower temperatures for the more stable peroxides. The half-life is a measure of the thermal stability of organic peroxides by measuring the time for decomposition of 50 percent of the original amount of peroxide, which is a half-life for a first-order reaction. These organic peroxides have been used in the polymerization of vinyl monomers to produce bulk polymers, polymer films and other polymer compositions.

Depending on the thermal stability and other physical characteristics of the particular peroxides, various organic peroxides can be used or transported in different forms when they are to act as initiators or curing agents for vinyl polymerization. Some of the organic peroxides such as the highly reactive percarbonates are so unstable that they must be shipped as a frozen solid or an undiluted liquid under refrigeration. Some less reactive organic peroxides, such as lauroyl peroxide and benzoyl peroxide are more stable at room temperature and can be activated with greater facility and with less stringent precautions. For example, the relatively more stable benzoyl peroxide, which is a solid at room temperature having a melting point of 106° to 107° C. can be used as granules or crystals or in a thick paste compounded with a phlegmatiser such as tricresyl phosphate. Also, benzoyl peroxide can be used in aqueous solution as is shown in U.S. Pat. No. 2,343,084 (Smith), wherein the small amount of benzoyl peroxide is dissolved in one or more polymerizable conjugated compounds and may also contain a resin in solution. This solution can be combined with a water solution of a partially saponified polyvinyl acetate. Also, it has been suggested in U.S. Pat. No. 3,795,630 (Jaspers et al) to have a chemically stable non-separating organic peroxide composition of an organic peroxide which is a solid at room temperature. The composition is obtained by mixing the solid peroxide like benzoyl peroxide with a liquid phlegmatiser like phthalate plasticizers or epoxidized soya bean oil and glycols, along with a hydrophobic alkyl group containing silica. In addition, it is shown in U.S. Pat. No. 4,039,475 (Jannes) to have a stable, pumpable aqueous suspension of organic peroxides containing one nonionic emulsifier having a maximum HLB value of 12.5 or a second emulsifier having a minimum HLB of 12.5 or a second emulsifer that is anionic.

Organic peroxides such as aryl alkyl peroxide like dicumyl peroxide; ester peroxides and aromatic and aliphatic acyl peroxides have been used in compositions for sizing fibrous materials for use in polymer applications as shown in U.S. Pat. No. 3,013,915 (Morgan). These peroxides which have low volatilities and low decomposition temperatures usually below about 180° F. (82° C.) are deposited on the fibers from an organic solution. In the composition along with the organic peroxide, there is present a suitable coupling agent.

It is also known as is shown in U.S. Pat. No. 3,837,898 (McCombs et al) to form a polybutadiene emulsion that contains heat activated curing agents to operate as a catalyst in the size coating on fibers. The curing agents are the well-known free radical catalysts such as organic peroxides, e.g., benzoyl peroxide, lauroyl peroxide, tert-butyldiethyl peracetate, diacetyl peroxide, as well as inorganic peroxides, and redox catalysts such as potassium persulfate. The polybutadiene emulsion is prepared by mixing the polybutadiene with an emulsifying agent and with benzoyl peroxide. To this mixture there is added sufficient water to form an emulsion of the liquid polymer in aqueous medium. The emulsion is then mixed with a mixture of water, glass fiber anchoring agents, and a gel agent and the resulting composition is homogenized to form a sizing composition having a solids content of about 2.80 and a pH of about 10.0 to 10.5. The emulsifying agents that can be used are any conventional emulsifying agents, but preferably are the nonionic emulsifying agents such as the polyoxyethylene derivatives of fatty acid, partial esters of sorbitol anhydrides, or the polyoxyethylene derivatives of fatty alcohols, or of the alkyl substituted phenols.

It was recently suggested in U.S. Pat. No. 3,849,148 (Temple) to prepare an aqueous size for glass fibers to be used in reinforcing polyolefin materials wherein the size contained a coupling agent, a heat stable organic peroxide, a nonionic surfactant and usually a lubricant or softener, and optionally a film-former. The heat stable organic peroxide includes organic peroxides having peak decomposition temperatures above about 200° F. (93° C.), for example, alpha alpha's bis(t-butyl peroxy)-diisopropyl benzene, tris(t-butylperoxy)-diisopropyl benzene, 2,5(t-butylperoxy)hexane, and 2,5(t-butylperoxy)hexyne. These heat stable peroxides are used in emulsions with nonionic surfactants such as polyethoxy phenols and are prepared and dispersed in water containing a coupling agent. Emulsions prepared at temperatures in the range of 120° F. (49° C.) to 210° F. (99° C.) including isooctyl phenyl polyethoxy ethanol are particularly useful. Other useful nonionic surfactants belonging to the class of polyethoxy phenols are nonyl polyethoxy ethanol and alkyl etherpolyethoxy ethanol. Other nonionic surfactants, which are useful, are polyalkylene glycol ethers, alkyl polyether alcohol and alkyl aryl polyether alcohol. The emulsion is prepared by thoroughly mixing the peroxide initiator with the nonionic surfactant maintaining the temperature of the mixture above the melting point of the free radical initiator. Suitable temperature control is possible by immersing the mixing vessel in a hot water bath or in boiling water. After thoroughly mixing the free radical peroxide initiator with nonionic surfactant, water is slowly added to the mixture at a temperature above the melting point of the free radical initiator, preferably in the range of about 140° F. (60° C.) to 150° F. (66° C.) until the emulsion inverts. The emulsion is then slowly cooled to ambient conditions by continued water addition. This emulsion is then slowly added to the aqueous mixture containing the coupling agent and the remaining water is added to the mixture to form an aqueous sizing composition for treating glass fibers.

In forming an emulsion for use in a sizing composition for glass fibers, it is necessary to obtain an emulsion that has a fine average particle size and that has good stability and dilutability. It is necessary to have an emulsion rather than a suspension because of the particle size limitation. An emulsion is a two-phase system consisting of two incompletely miscible liquids, the one liquid being dispersed as fine droplets or particles in the other liquid. A suspension is a two-phase system in which the dispersed phase is a solid. The stability of an emulsion depends upon such factors as particle size; difference between the densities of the dispersed, internal phase, which is the liquid broken-up into droplets, and of the continuous or external phase, which is the surrounding liquid; the viscosity of the continuous phase in the emulsion; the charges on the particles; the nature, effectiveness and amount of emulsifier used; and the conditions of storage and use, including the temperatures of storage and use, agitation, vibration, dilution and evaporation.

The average particle size and particle size distribution of the emulsion are controlled by such factors as the quantity of the efficiency of the emulsifier, the order of mixing and the agitation employed. The average particle size and particle size distribution of the emulsion are important factors, since large liquid particles or droplets in the emulsion or, for that matter, particles of solid material as in a suspension would not provide an adequate uniform coating to the glass fibers. Also solid particles would abraid the glass fibers, and large liquid particles would cover the surface of the glass fiber in a spotty fashion leaving hiatuses in the coating along the fibers that as a result would not adequately contact the matrix resin to be reinforced.

The emulsion in a sizing composition for glass fibers must be of sufficient dilution to approach a water thin liquid in order to facilitate application to the glass fibers during formation of the fibers. Dilution of an emulsion, especially dilution to the extent of a water-thin-liquid, can lead to an unstable emulsion. Also, the emulsion must be shear stable to withstand the mixing of the sizing composition before being applied to the glass fibers, and it must be shelf stable for periods of three days to more than a week so that the material may be stored before application to the glass fibers. Also, the emulsion must be process stable to enable the size to be applied to the fibers.

A problem that has recently surfaced with the use of heat stable, solid organic peroxides is when they are used in an emulsion, which is formed at temperatures above the melting point of the peroxide the resultant emulsion that is used at temperatures below the melting point of the peroxide tends to have particle sedimentation or creaming.

It is an object of the present invention to provide an emulsion of an organic peroxide that can be diluted to have a viscosity approaching the viscosity of water and that has improved shear, shelf and process stability.

It is an additional object of the present invention to provide an emulsion of a heat stable organic peroxide that can be used in a sizing composition for glass fibers where the emulsion is shear stable and shelf stable and process stable within the sizing composition.

It is a further additional object of the present invention to provide processes for preparing an emulsion of a heat stable organic peroxide and a sizing composition containing same that has improved dilutability, that is shear stable, shelf stable and process stable and that has good average particle size and particle size distribution.

It is another further object of the present invention to provide sized glass fiber strands having fibers in the strand with a coating of an aqueous sizing composition containing a coupling agent, an emulsion of heat stable organic peroxide that has improved dilutability, improved shear, shelf and process stability, and a good particle size distribution and average particle size and usually a lubricant or softener and optionally a filmformer.

SUMMARY OF THE INVENTION

The aforementioned objects and other objects inherent in the following description are accomplished by having an emulsion of an organic peroxide that is a liquid at 20° C. and that can be of a more stable nature and that is dilutable to a viscosity approaching the viscosity of water. These liquid organic peroxides that are insoluble or of limited solubility in water are selected from hydroperoxides, α-oxy, and α-peroxy hydroperoxides; dialkyl peroxides, aldehyde or ketone peroxides, diacyl peroxides, peroxyesters, peroxy acids, peroxydicarbonates, peroxymonocarbonates and perketals. A particularly useful class of organic peroxides are those having structures such as:

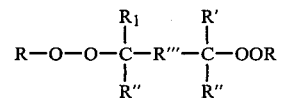

where R is an alkyl radical normal, iso, sec or tertiary, and R' and R" are hydrogens, individual hydrocarbon radicals with less than around 14 carbon atoms or are alkylene radicals connected to form a cycloalkylene radical, and R''' is a (C≡C) radical or (CH$_2$CH$_2$)n radical where n is 1 or 2.

The aqueous emulsion has from about 1 to about 60 weight percent of the aforedescribed liquid organic peroxides (including hydroperoxides) and about 1 to about 15 weight percent of a three component emulsifier blend and at least about 35 weight percent of water.

If the emulsion is to be shipped any considerable distance, the amount of water added is just that amount needed to invert most of the water insoluble or limited water soluble material to an oil-in-water emulsion, thereby making the emulsion a concentrated oil-in-water emulsion that can be further diluted at the location of use.

The three component nonionic emulsifier blend is selected from one or more of the following: polyalkylene glycol ethers, or alkylaryl polyether alcohol, or polyoxypropylene-polyoxyethylene condensates or phenoxypolyethoxyethanols, polyethylene derivatives of fatty acids, partial esters of sorbitol anhydrides, ethoxylated alcohols, ethoxylated alkyl phenols, ethoxylated fatty acids, ethoxylated faty esters and oil, fatty acids, glycerol esters, glycol esters, monoglycerides and derivatives, and sorbitan derivatives and sucrose esters and derivatives and mixtures thereof. One emulsifier has a low HLB (hydrophilic-lipophilic-balance) value, while another emulsifier has a high HLB value, and the other emulsifier has an HLB in the range between the low and high HLB values wherein the emulsifiers are used in the necessary weight ratios to give a combined HLB value for the three emulsifiers in the range of about 9 to about 20.

The peroxide emulsion of the present invention can be prepared using any of the standard techniques and equipment known to those skilled in the art.

The aforedescribed emulsion of the organic peroxide has many uses in the polymerization of vinyl and diene polymers. The emulsion is particularly useful in an aqueous treating composition for fibers and fillers to be used in polymeric reinforcement. For example, the emulsion is particularly useful in a sizing composition for glass fibers to be used in polymer applications. The sizing composition is an aqueous composition containing a coupling agent, the organic peroxide-containing emulsion, and usually a lubricant or softener and optionally a film-former. The aqueous sizing composition containing the organic peroxide emulsion is used to treat glass fibers during the formation of the glass fibers. Glass fibers so treated are then dried to drive off some of the water in the aqueous sizing composition and the treated glass fibers are used for bonding or reinforcing polymers such as homopolymers and copolymers of polyolefins, unsaturated polyesters and the like.

DETAILED DESCRIPTION OF THE INVENTION

In the preparation of a more storage, shear and process stable, dilutable, aqueous emulsion of an organic liquid peroxide, non-exclusive examples of the liquid organic peroxides having limited water solubility or water insolubility include: diperlargonyl peroxide, 2,5-di-(2-ethylhexanoylperoxy-)-2,4-dimethylhexane; t-butylperoxypivalate; t-butylperoxycrotonate; t-butylperoxy(2-ethylbutyrate di-sec-butyl peroxydicarbonate; t-butylperoxybenzoate; peroxyoctoates; t-butylperoxyacetate; t-butylperoxyisobutyrate; O-O-t-butyl-O-isopropyl monoperoxycarbonate; n-butyl-4,4-bis-(t-butylperoxy) valerate; 2,5-di(t-butylperoxy)-2,5-dimethylhexane; 2,5-di(t-butylperoxy)-hexane; d-t-butylperoxide; diethylperoxide; 2,5-di(t-butylperoxy)-2,5-dimethylhexyne-3; 2,5-di(t-butylperoxy)hexyne; p-methane hydroperoxide; cumene hydroperoxide; diisopropylbenzene hydroperoxide; t-butyl hydroperoxide; methyl amyl ketone peroxide; cyclohexanone peroxide; 1,1-bis(t-butylperoxy)-3,5-trimethylcyclohexane and the like.

It has recently been suggested to use free radical initiators that are more heat-stable organic peroxides in the polymerization of vinyl and diene-containing monomers or polymers. The use of the phrase "more heat-stable organic peroxides" encompasses those peroxides having half-lives exceeding approximately 60 hours at about 212° F. (100° C.) and 20 minutes at about 300° F. (149° C.). The term "half-life" is a measure or reactivity of the organic peroxide and is defined as the time it takes for one half of a given quantity of peroxide to decompose at a particular temperature. Examples of these peroxides include alpha, alpha's bis(t-butylperoxy) diisopropyl benzene, tris(t-butylperoxy) diisopropyl benzene, 2,5-dimethyl-2,5-di(t-butyl peroxy) hexane and 2,5-dimethyl-2,5-di(t-butylperoxy) hexyne, and the like. It has been suggested to use these heat-stable organic peroxides in emulsions, where the emulsion is prepared at a temperature in the range of about 120° F. (49° C.) to about 200° F. (93° C.) with the use of nonionic surfactants such as polyethoxy phenols or other nonionic surfactants belonging to the class of polyethoxy phenols, nonyl polyethoxy ethanol, and alkylether polyethoxy ethanol, polyalkylene glycol ethers, alkyl polyether alcohol and alkyl aryl polyether alcohol.

It has now been discovered that with the use of organic peroxides that are liquid at a temperature of 20° C. a unique three component emulsifier blend enables the production of an aqueous organic peroxide emulsion having better shear stability, shelf stability, and process stability and dilutability while having a fairly narrow distribution of particle size with an average particle size of around 1.5 microns or less.

The liquid organic peroxides that are relatively heat-stable, are those peroxides having the structure:

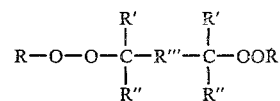

where the R, R', R" and R'" are those chemical moieties as mentioned above. Non-exclusive examples of these liquid organic peroxides include 2,5-dimethyl-2,5-bis(t-butylperoxy) hexane; 2,5-dimethyl-2,5-bis(t-butylperoxy) hexyne-3; 2,5-bis-(tertiary-amylperoxy)-2,5-dimethyl hexane; 1,1'-ethylene bis(tertiaryamylperoxycyclohexane); 2,5-bis(tertiary butylperoxy)-2,5-diphenyl hexane; 3,6-bis(tertiary-butylperoxy)-3,6-dimethyl octane; and 2,5-bis(2,5-dimethyl-2-hexylperoxy)-2,5-dimethyl hexane; 2,5-bis(tertiary-butylperoxy)-2,5-diphenyl hexane; 2,7-bis(tertiary-butylperoxy)-2,7-dimethyl octane; 2,5-bis(tertiary butylperoxy)-2,5-dicyclohexylhexene; 2,5-bis(tertiary-butylperoxy)-2,5-dibenzylhexane. The amount of the liquid organic peroxide used in the oil-in-water emulsion is generally in the range of about 1 to about 70 percent by weight of the emulsion, but a preferred lower limit of at least 10 is more suitable when the emulsion is to be used in a sizing composition.

The three emulsifier blend has nonionic emulsifiers more specifically selected from polyethoxy phenols, polyalkylene glycol ethers, alkyl polyether alcohol, alkylaryl polyether alcohol, ethylene oxide alkylated phenol condensation products, and condensation products of ethylene oxide and propylene glycol and mixtures thereof used in a combination to give the desired HLB value of about 9 to about 20 and preferably about 9 to about 15. One emulsifier is selected that has a high HLB value in the range of about 12 to about 20. A second emulsifier has a lower HLB value in the range of about 6 to about 12 while a third emulsifier has an HLB value in a middle range of about 9 to about 15. The three emulsifiers are used in amounts that give a combined HLB in the range of about 9 to about 20 and preferably 9 to 15. It is particularly useful to use the emulsifiers in equal proportions, although any proportion of the various emulsifiers can be used to give the desired HLB range.

In preparing the emulsion of the present invention, one or more of the desired liquid peroxides, has added to it the three component emulsifier blend. The individual emulsifiers can be added separately to the peroxide, or the emulsifiers can be added in a combination of all three or of any two added as a combination and then the third emulsifier added individually. After the emulsifiers are added, the resulting mixture is subjected to standard techniques, conditions and equipment known to those skilled in the art. Such techniques include subjecting the mixture to high shear rates and diluting slowly with water, where the water can be at ambient temperature or an elevated temperature. The water is added until the emulsion inverts to an oil-in-water emulsion and, if water at an elevated temperature was used, the emulsion is slowly cooled to ambient conditions by continued water addition. The amount of water added to the emulsion is at least about 35 percent by weight of the emulsion composition. If the emulsion is to be shipped any considerable distance, the least amount of water used is that needed to invert most of the water insoluble or limited water soluble materials to an oil-in-water emulsion.

This emulsion composition is then formed into an aqueous sizing composition having any coupling agent, and usually any lubricant or any softener, and optionally any film-former known to those skilled in the art. The amount of emulsion composition incorporated into the sizing composition depends on the amount of peroxide in the emulsion composition. Whatever the amount of peroxide in the emulsion, the amount of emulsion used in the sizing composition is that amount to give an amount of active organic peroxide in the sizing composition in the range of 0.1 to about 6 percent by weight of the sizing composition. This formulation involves slowly adding the emulsion to an aqueous mixture containing the coupling agent and any lubricant or softening agent and film-former and the remaining water to make the aqueous sizing mixture. Although any lubricant or softening agent or film-former to be used in the sizing composition can be added after the emulsion is added to the aqueous mixture containing the coupling agent, once the emulsion of the present invention is prepared, the aqueous sizing composition can be made in a manner similar to that as described in U.S. Pat. No. 3,849,148 (Temple) which is hereby incorporated by reference. Generally, the amount of organic-silane coupling agent that is usually a vinyl-containing silane in the sizing composition is in the range of about 0.2 to about 10 percent by weight of the aqueous sizing. The lubricant in the sizing composition is generally a cationic active, acid solubilizable, fatty acid amide and it is used in the range of about 0.001 to about 1 percent by weight of the aqueous sizing composition. If a film-former is used, it is usually a polyvinyl acetate polymer or copolymer used in an amount in the range of about 0.5 to about 12 weight percent of the size.

The aqueous sizing composition is applied to individual glass fibers during their formation by any conventional method of applying sizing compositions to glass fibers. Such methods are shown in U.S. Pat. No. 3,849,148 (Temple) which has been incorporated by reference.

The sized glass fibers can be used in any form such as fibers, strands, chopped strands, mats of continuous and/or chopped strand and the like for reinforcing polymers such as unsaturated, polyesters, polyolefins and particularly polypropylene. Glass fiber mats for reinforcing polyolefins are shown in U.S. Pat. No. 3,849,148 which shows the production of glass fiber reinforced polyolefin laminates which has been incorporated by reference.

PREFERRED EMBODIMENT

The emulsion of the present invention is preferably an emulsion of 2,5-dimethyl-2,5-bis(t-butylperoxy)hexane which is commercially available from the Lucidol Division of Pennwalt Corporation, under the trade designation "Lupersol 101" organic peroxide. The liquid peroxide is used in an amount of about 1 to about 70 and more specifically from about 30 to about 60 weight percent of the emulsion. It is preferred to use a three emulsifier blend wherein the first emulsifier is a trimethyl nonyl polyethylene glycol ether, such as that commercially available from Union Carbide Corporation by the trade designation "Tergitol TMN-6". This ether has an HLB of 11.7, and it is used in an amount of about 0.1 to about 5 weight percent of the emulsion. Combined with the ether emulsifier is a second emulsifier, which is nonyl phenoxy polyethyleneoxy ethanol commercially available from GAF Corporation Chemical Products, under the trade designation "Igepal CO-630" having an HLB of 13. The ethanol emulsifier is used in an amount of about 0.1 to about 5 weight percent of the aqueous emulsion. These two emulsifying agents are combined and stirred until clear. The third emulsifying agent is a condensate of propylene oxide with hydrophilic bases formed by condensing ethylene oxide with ethylene glycol, and it is commercially available from BASF Wyandotte Industrial Chemical Group, under the trade designation "Pluronic-P-65". The glycol-oxide condensate emulsifier has an HLB of 17 and is used in an amount in the range of about 0.1 to about 5 weight percent of the aqueous emulsion composition. A first portion of the total amount, preferably one-half the total amount of the glycol-oxide product is added to the ether and ethanol emulsifiers then the remaining portion is dissolved in around 50/50 blend with water. The dissolved 50/50 emulsifier blend is combined with the ether, ethanol and first portion of condensate emulsifiers after the mixture of the ether emulsifying agent, the ethanol emulsifying agent and first portion, preferably one-half the glycol-oxide condensate emulsifier has been added to the liquid peroxide and the resultant mixture is homogenized. The amount of the three emulsifier blend in the emulsion is in the range of about 1 to about 15 and preferably about 3 to about 12 weight percent of the emulsion. An amount of water at about 23° C. in the range of about 15 to 30 weight percent of the aqueous emulsion composition is added to the resultant mixture and then an amount of cold water in the range of about 20 to about 50 weight percent is added to produce the aqueous emulsion having a total amount of water in the range of about 35 to about 80 weight percent.

The aqueous emulsion is then preferably added to an aqueous binder composition containing a coupling agent, that is preferably vinyl tris(beta methoxy ethoxy) silane, present in an amount of about 0.2 to about 10 weight percent of the aqueous sizing composition. In an alternative embodiment, a lubricant such as "Emerylube" 6717 commercially available from Emery Industries, is present in the sizing composition in an amount in the range of about 0.001 to about 3 weight percent of the aqueous sizing composition. In another embodiment a polyvinyl acetate copolymer is added to the sizing composition in an amount in the range of about 0.5 to about 12 weight percent.

The aqueous sizing composition is applied to individual glass fibers during their formation according to the manner illustrated in U.S. Pat. No. 3,849,148 (Temple) hereby incorporated by reference. The aqueous emulsion of the organic peroxide can be used in any of the sizing compositions described in U.S. Pat. No. 3,849,148.

The aqueous emulsion of the present invention will be further elucidated by making reference to the following examples.

Table I presents examples showing components of the aqueous emulsion in their gram weight amounts and weight percent amount.

TABLE I

| | Peroxide Emulsions | | |
|---|---|---|---|
| Formulation | 1 gm/wt % | 2 gm/wt % | 3 gm/wt % |
| 2,5-dimethyl-2,5 bis(t-butylperoxy) hexyne-3 [Lupersol 130] | 250/41.9 | 333/40.2 | 1339/37.8 |
| Trimethyl nonyl polyethylene glycol ether (Tergitol TMN-6) | 6.3/1.1 | 8.3/1.0 | 33.4/.9 |
| Nonyl phenoxy polyethyleneoxy ethanol (Igepal CO-630) | 6.3/1.1 | 8.3/1.0 | 33.4/.9 |
| Propylene oxide-ethylene oxide condensate (Pluronic P-65) | 6.3/1.1 | 8.3/1.0 | 33.4/.9 |
| Water | | | |
| Warm (23° C.) | 100/55 | 100/56.8 | 300/59.4 |
| Cold | 228 | 371 | 1807.8 |
| Solids | 45% | 43.2% | 40.6 |
| pH | 4.0 | 4.2 | 4.4 |
| Stability | | | |
| Initial | 0,0 Y Good | Good | Good |
| 1 hr. | 0 0 Y Good | — | Good |
| 24 hr. | 0 VL-Y Good | — | 0 0-Y Very Good |
| 48 hr. | 0 VL Y Good | — | — |
| 72 hr. | — | 0 0-Y Good | — |

0 = no separation or sediment
Y = some separation but it is dispersible
VL = very light sediment Table II presents stability data for emulsions 2 and 3 of Table I in sizing compositions for treating glass fibers.

TABLE II

| | Sizing Compositions | |
|---|---|---|
| Ingredient | 1 gm/wt % | 2 gm/wt % |
| Peroxide Emulsion #2 of Table I | 828.9 gm/4.4 | — |
| Peroxide Emulsion #3 of Table I | — | 3547 gm/3.2 |
| Acetic acid | 26.4 gm/.14 | 106 gm/.1 |
| Vinyl tris(2-methoxy-ethoxy) silane (A-172 available from Union Carbide Corporation) | 664/3.6 | 2669/2.4 |
| Emerylube 6717 amidated polyamine lubricant | 4.4/.02 | 26.4/.02 |
| Polyvinyl acetate (NS-25-1059 available from National Starch & Chemicals, Inc.) | 350/1.9 | 2100/1.9 |
| Water | 6814 gm/90 | dilute to 113.6 liters 92.5 |
| Solids (wt %) | 4.18 | 3.14 |
| Stability | | |
| Initial | Good | — |
| 1 hr. | 0-VL-Y-Good | — |
| 24 hr. | — | 0-0-Y Very Good |
| 72 hr. | 0-0-Y Very Good | |

The foregoing has described an aqueous emulsion of an organic peroxide that is a liquid at 20° C. and that decomposes to free radicals wherein the emulsion has improved shear, storage and processing stability and improved dilutability. In addition to the organic peroxide, the emulsion contains a three component, nonionic emulsifier blend and water. The aqueous emulsion can be used in any application for organic peroxides, but is especially useful for incorporation of relatively heat-stable organic peroxides into a sizing composition for treating glass fibers. The sizing composition is used to treat glass fibers in a conventional manner and the sized glass fiber strands are used in any form such as chopped strand, continuous strand, roving, mat preferably needled mat to reinforce polymers such as polyolefins, like polypropylene, unsaturated polyesters and the like. The relatively good heat-stability of the organic peroxide allows the sized glass fiber strands to be subjected to heat after forming without the peroxide decomposing, but when the sized strands are then heated in the presence of the polymer, the peroxide decomposes into free radicals to bind the glass fibers to the polymer.

We claim:

1. An aqueous emulsion of an organic peroxide that is a liquid at about 20° C. and is insoluble or has limited solubility in water, wherein the emulsion has improved stability and dilutability and has an average particle size of around 1.5 microns or less, consisting essentially of:
   (a) at least 1 to about 60 percent by weight of said liquid organic peroxide selected from the group consisting of hydroperoxides, α-oxy and α-peroxy hydroperoxides, dialkyl peroxides, aldehyde and ketone peroxides, diacyl peroxides, peroxyesters, peroxy acids, peroxydicarbonates, peroxymonocarbonate and perketals,
   (b) about 1 to about 15 weight percent of a nonionic emulsifier blend having three emulsifiers selected from the group consisting of polyalkylene glycol ethers, dialkylarylpolyether alcohols, and polyoxypropylene-polyoxyethylene condensates, phenoxypolyethoxyethanols, polyethylene derivatives of fatty acids, partial esters of sorbitol anhydrides; ethoxylated alcohols, fatty acids, fatty esters and oils, alkylphenols; glycerol esters, sucrose esters and derivatives, monoglycerides and derivatives, and sorbitan derivatives, polyethoxy phenols, alkyl polyether alcohols, ethylene oxide alkylated phenol condensation products, and mixtures thereof wherein one emulsifier has an HLB in the range of about 6 to about 12 and one emulsifier has an HLB in the range of about 9 to 15 and one emulsifier has an HLB in the range of about 12 to about 20 each in proportions to give an overall HLB level for the emulsifier system in the range of about 9 to about 20, and (c) the remaining weight percent of the emulsion is water.

2. Aqueous emulsion of claim 1 wherein the liquid organic peroxide has a half-life exceeding 60 hours at 212° F. (100° C.) and 20 minutes at 300° F. (149° C.).

3. Aqueous emulsion of claim 2 wherein the liquid organic peroxide has the formula:

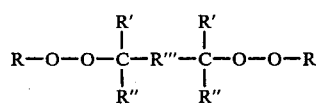

where R is an alkyl radical, and R' and R'' are hydrogens, individual hydrocarbon radicals having less than 14 carbon atoms, or are alkylene radicals connected to form a cycloalkylene radical and R''' is a (C≡C) or (CH$_2$—CH$_2$)n moiety, where n is 1 or 2.

4. Aqueous emulsion of claim 1 wherein the organic peroxide is selected from the group consisting of 2,5-dimethyl-2,5-bis(t-butylperoxy)hexane or 2,5-dimethyl-2,5-bis(t-butylperoxy)hexyne.

5. Aqueous emulsion according to claims 1 or 2 wherein the three emulsifiers are present in equal amounts.

6. Aqueous emulsion according to claim 2 being present in a sizing composition for glass fibers.

7. Glass fibers having an aqueous sizing composition having the aqueous emulsion of claim 2.

8. The aqueous emulsion according to claim 1 or 2 wherein one of the three emulsifiers is trimethyl nonyl polyethylene glycol ether.

9. The aqueous emulsion of claim 8 wherein the trimethyl nonyl polyethylene glycol ether has an HLB of 11.7.

10. Aqueous emulsion according to claims 1 or 9 wherein one of the emulsifiers is nonyl phenoxy polyethyleneoxy ethanol.

11. Aqueous emulsion according to claim 10 wherein the nonyl phenoxy polyethyleneoxy ethanol has an HLB of 13.

12. Aqueous emulsion according to claim 10 wherein one of the emulsifiers is a propylene oxide-ethyleneoxide-glycol condensate.

13. Aqueous emulsion of claim 12 wherein the propylene oxide-ethylene oxide-glycol condensate emulsifier has an HLB of 17.

14. Method of preparing an aqueous emulsion of an organic peroxide that is insoluble or of limited solubility in water and is a liquid at 20° C. to produce an emulsion having good stability and dilutability, consisting essentially of:

(a) combining the liquid organic peroxide that is a liquid at 20° C. selected from the group consisting of hydroperoxide, α-oxy and α-peroxy hydroperoxides, dialkyl peroxides, aldehyde peroxides, ketone peroxides, diacyl peroxides, peroxyesters, peroxy acids, peroxy-dicarbonates, peroxymonocarbonates and perketals with a mixture of a nonyl phenoxy polyethylenoxy ethanol with an HLB of 11.7, and of a trimethyl nonyl polyethylene glycol ether having an HLB of 13 and of a first portion of the total amount used in the emulsification of a propylene oxide-ethyleneoxide-glycol condensate emulsifier having an HLB of 17 with mixing, (b) adding to the combination of (a) the second portion of the propyleneoxide-ethyleneoxide glycol condensate emulsifier dissolved in at least around a 50/50 blend with water that can be at ambient temperatures, (c) diluting the combination of (b) with water which can be at ambient temperatures in sufficient amounts to give a total amount of water in the emulsion of at least about 35 percent by weight, and (d) subjecting the combination of (c) to high speed mixing to emulsify the combination.

15. The method of claim 14 wherein the organic peroxide is selected from the group consisting of 2,5-dimethyl-2,5-bis(t-butylperoxy)hexane and 2,5-dimethyl-2,5-bis(t-butylperoxy)hexyne.

* * * * *

UNITED STATES PATENT AND TRADEMARK OFFICE
CERTIFICATE OF CORRECTION

PATENT NO. : 4,391,876

DATED : July 5, 1983

INVENTOR(S) : Albert E. Tamosauskas et al.

It is certified that error appears in the above-identified patent and that said Letters Patent is hereby corrected as shown below:

On the cover page, in the Abstract, the second paragraph, third line, "emulsions" should read —emulsifiers—.

Signed and Sealed this

First Day of November 1983

[SEAL]

Attest:

GERALD J. MOSSINGHOFF

Attesting Officer     Commissioner of Patents and Trademarks